(12) United States Patent
Evans et al.

(10) Patent No.: US 6,293,189 B1
(45) Date of Patent: Sep. 25, 2001

(54) JUICE EXTRACTOR

(75) Inventors: Kevin E. Evans, Bradenton; Jeffrey L. Korengel, Sarasota; Harold Pollack, St. Petersburg; David S. Lineback, Bradenton, all of FL (US)

(73) Assignee: Tropicana Products, Inc., Bradenton, FL (US)

( * ) Notice: Subject to any disclaimer, the term of this patent is extended or adjusted under 35 U.S.C. 154(b) by 0 days.

(21) Appl. No.: 09/523,882

(22) Filed: Mar. 13, 2000

(51) Int. Cl.⁷ .................................. A23N 1/02; B30B 9/02
(52) U.S. Cl. ........................... 99/510; 99/495; 100/98 R; 100/108; 100/213
(58) Field of Search ............................. 99/495, 508–513; 100/37, 213, 245, 108, 98 R, 125, 104; 426/481–485

(56) References Cited

U.S. PATENT DOCUMENTS

| | | | |
|---|---|---|---|
| 1,115,754 | * 11/1914 | Walker | 99/507 |
| 1,545,818 | 7/1925 | Elfstrum et al. | |
| 1,649,755 | 11/1927 | Thompson | |
| 1,960,501 | 5/1934 | Maull | 100/41 |
| 2,018,932 | * 10/1935 | Thorne | 99/508 X |
| 2,042,341 | * 5/1936 | Ilgenfritz | 99/506 X |
| 2,099,170 | * 11/1937 | Majewski, Jr. | 99/495 X |
| 2,160,523 | * 5/1939 | Scurlock | 99/507 |
| 2,172,790 | 9/1939 | Ferrari et al. | 146/174 |
| 2,238,571 | * 4/1941 | Scott | 99/508 X |
| 2,420,680 | 5/1947 | Pipkin | 100/50 |
| 2,497,335 | * 2/1950 | Wissner | 99/495 X |
| 2,674,182 | * 4/1954 | Kirkpatrick | 100/98 R |
| 2,688,470 | 9/1954 | Marco | 259/8 |
| 2,786,502 | * 3/1957 | Turner | 100/288 X |
| 3,162,114 | 12/1964 | Quiroz | 100/37 |
| 3,269,301 | 8/1966 | Krause | 100/37 |
| 3,351,000 | 11/1967 | Alexander | 100/98 |
| 3,448,682 | 6/1969 | Rickard et al. | 100/53 |
| 3,507,392 | 4/1970 | Alexander et al. | 210/172 |
| 3,682,092 | 8/1972 | Breton et al. | 100/52 |
| 3,736,865 | 6/1973 | Hait | 100/98 R |
| 3,858,500 | 1/1975 | Rohm et al. | 99/504 |
| 3,969,802 | 7/1976 | Bouvet | 29/121 |
| 4,170,935 | 10/1979 | Rohm et al. | 100/121 |
| 4,421,021 | 12/1983 | Holbrook | 99/504 |
| 4,530,277 | * 7/1985 | Matsumoto | 100/131 X |
| 4,546,698 | 10/1985 | Bouvet | 100/121 |
| 4,759,938 | 7/1988 | Rohm | 426/481 |
| 4,765,550 | 8/1988 | Chen | 241/293 |
| 5,070,778 | 12/1991 | Cross et al. | 99/510 |
| 5,084,177 | * 1/1992 | Keene | 210/514 |
| 5,170,700 | 12/1992 | Anderson et al. | 100/98 R |
| 5,188,021 | 2/1993 | Bushman et al. | 99/502 |
| 5,269,218 | 12/1993 | Alexander et al. | 99/502 |
| 5,339,729 | 8/1994 | Anderson | 99/509 |
| 5,408,923 | 4/1995 | Bushman et al. | 99/504 |
| 5,479,851 | 1/1996 | McClean et al. | 99/512 |
| 5,483,870 | 1/1996 | Anderson et al. | 99/510 |
| 5,487,331 | 1/1996 | Bushman et al. | 99/504 |
| 5,510,028 | * 4/1996 | Kuhlman | 210/307 |
| 5,511,468 | 4/1996 | Bushman et al. | 99/504 |
| 5,520,105 | * 5/1996 | Healy | 100/98 R |
| 5,655,441 | 8/1997 | Mendes | 99/510 |
| 5,657,927 | 8/1997 | Bushman et al. | 239/240 |
| 5,720,218 | 2/1998 | Mendes | 99/509 |
| 5,720,219 | 2/1998 | Mendes | 99/509 |
| 5,802,964 | 9/1998 | Mendes | 99/509 |
| 5,873,302 | 2/1999 | Segredo | 99/510 |
| 5,970,861 | 10/1999 | Suter et al. | 100/37 |
| 5,992,311 | 11/1999 | Suter et al. | 100/37 |
| 5,996,485 | 12/1999 | Suter et al. | 100/37 |

* cited by examiner

Primary Examiner—Timothy F. Simone
(74) Attorney, Agent, or Firm—Cook, Alex, McFarron, Manzo, Cummings & Mehler, Ltd.

(57) ABSTRACT

An extractor for separating the juice and juice sacs from a citrus fruit that includes a lower cup for supporting a single piece of citrus fruit and an upper cup disposed vertically above the lower cup with the upper and lower cups moveable relative to each other in a vertical direction so as to cooperate to squeeze the piece of citrus fruit placed therebetween. An upper cutter is provided for cutting a plug in the citrus to permit the separation of the peel from the juice and the juice sacs, while a lower cutter is provided for cutting the plug to allow the juice and juice sacs to exit therethrough when the fruit is squeezed between the upper and lower cups. A strainer tube is vertically oriented beneath the lower cup and lower cutter, with the strainer tube having a plurality of circumferential slots along its working length.

11 Claims, 3 Drawing Sheets

JUICE EXTRACTOR

The present invention relates to a citrus juice extractor and, more particularly, to a citrus juice extractor that provides for a pulpier juice product.

BACKGROUND OF THE INVENTION

The juice of citrus fruits has long been popular as a beverage due to its flavor, as well as its nutritional and health promoting properties.

In currently available industrial-scale machines for citrus juice extraction, the citrus fruit is placed one-at-a-time between a series of two opposed cups that move toward each other. A hole is cut in the skin or peel of each citrus fruit, and as the cups move together to squeeze the fruit, the internal components of the fruit, including juice, pulp (or juice sacs) and seeds, plus the cut portion of the peel are forced through the hole cut in the fruit and into a strainer tube. The juice and some pulp then are forced outward through the strainer tube and collected in a reservoir, while the undesired seeds and peel remain in the tube and are subsequently disposed of. See, generally, U.S. Pat. Nos. 5,996,485 and 5,655,441, which disclose two different configurations for juice extractors, and which are incorporated herein by reference.

Over time, it has been determined that many people prefer the taste of juice with intact pulp cells or juice sacs. In extractors of the type described in the above-identified patents, the strainer tubes are believed to be configured and/or oriented in such a way to restrict the flow of intact juice sacs therethrough, at times resulting in loss of valuable pulp into waste streams or less desirable byproducts. Flow restriction which can be characteristic of prior extractors also can result in a significant number of fruit sacs becoming cut or otherwise damaged when passing through the strainer tube. Further, while pulpier juice is desired, the travel of extraneous pulpy material into the primary juice stream through the strainer tube must be avoided.

Accordingly, it is a principal object of the present invention to provide a juice extractor which provides for pulpier, more flavorful juice product.

More specifically, it is an object of the present invention to provide a juice extractor that incorporates an improved strainer tube assembly that permits more of the desirable pulp to flow therethrough while limiting the travel of the undesirable portions of the inside of the fruit into the juice stream.

Another object of this invention is to provide an improved citrus juice extraction apparatus and method which satisfy a desirable texture profile analysis of pulp juice while reducing pulp damage and increasing pulp extraction efficiency and desirable pulp yield.

SUMMARY OF THE INVENTION

These objects, as well as others which will become apparent upon reference to the following detailed description and accompanying drawings, are provided by an extractor for separating the juice and juice sacs from a citrus fruit that includes a lower cup for supporting a single piece of citrus fruit and an upper cup disposed vertically above the lower cup with the upper and lower cups moveable relative to each other in a vertical direction so as to cooperate to squeeze the piece of citrus fruit placed therebetween. An upper cutter is provided for cutting a plug in the citrus to permit the separation of the peel from the juice and the juice sacs, while a lower cutter is provided for cutting the plug to allow the juice and juice sacs to exit therethrough when the fruit is squeezed between the upper and lower cups. A strainer tube is vertically oriented beneath the lower cup and lower cutter, with the strainer tube having a plurality of circumferential slots along its working length. A plunger tube is slidingly received within the stainer tube for forcing the juice and juice sacs outwardly through the slots and the strainer tube into a separate reservoir. The slots in the strainer tube may be of equal width and evenly spaced apart or of varying widths. In any event, the slots are preferably between about 0.5 and about 3 millimeters in width.

DETAILED DESCRIPTION OF THE PREFERRED EMBODIMENT

Figure 1:
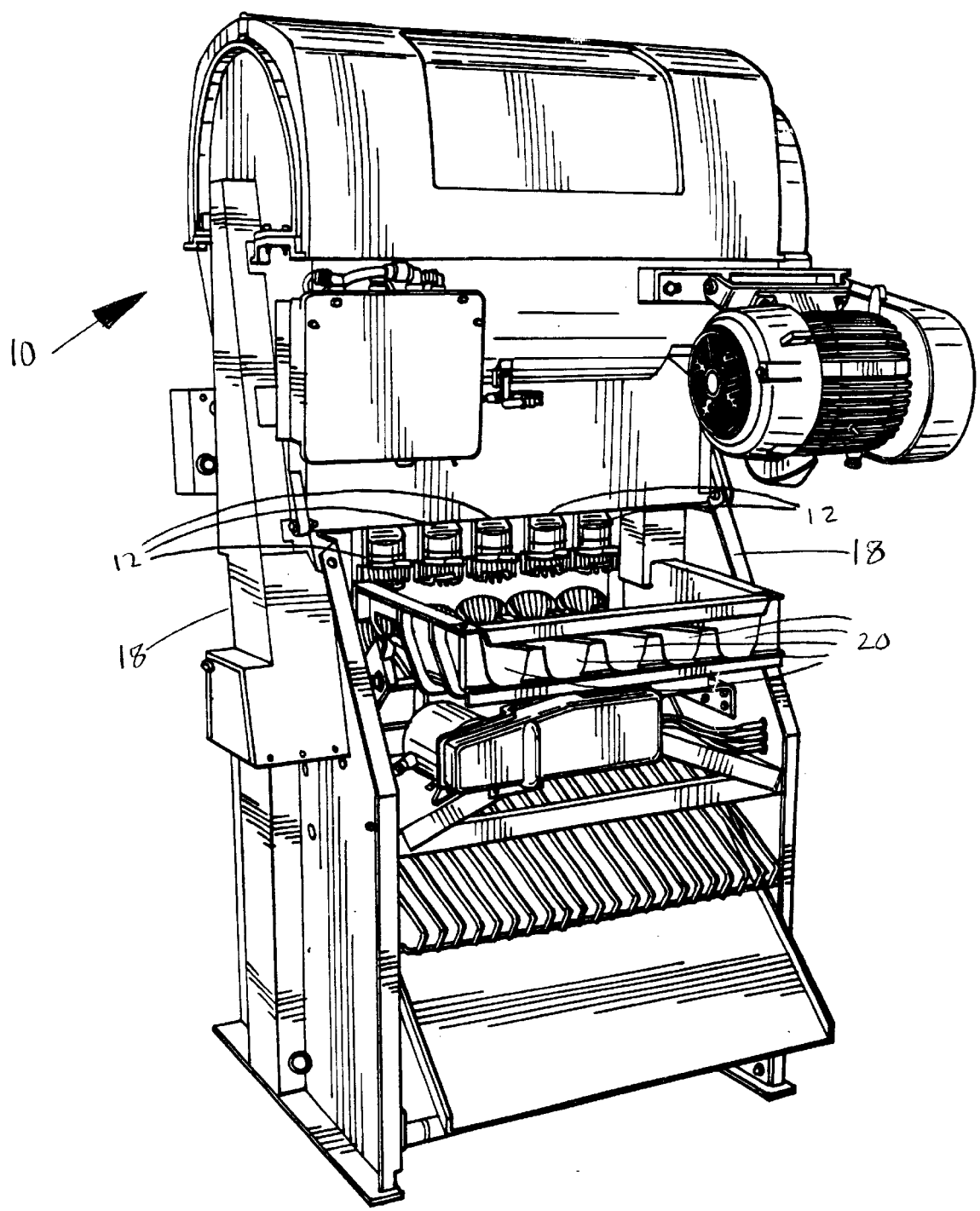
FIG. 1 is a perspective view of an automated juice extraction machine which may incorporate the present invention.

With reference to FIG. 1, there is seen a juice extractor machine, generally designated as 10, made up of five individual extractor units 12, each having an upper cup 14 and a lower cup 16, ganged together in a common frame 18.

Before the citrus fruit is placed on the individual extractor unit 12, it is unloaded either manually or otherwise into a hopper from which it is conveyed through a washing process, typically a series of brushes where the fruit is gently scrubbed to remove field oils, soil, mold and dust. Fruit is then typically discharged onto a roller grader where workers or automatic sorters select the fruit to remove broken pieces, leaves and other undesirable materials from the flow of fruit supply. The fruit is then typically conveyed to a sizing roller to separate the fruit into sizes equivalent to the size range of the upper and lower cups of the individual extractor units in order to ensure the maximum yield and quality. The fruit is then conveyed to the proper extractor machine 10, such as that shown in FIG. 1 where the individual fruits roll down the chutes 20 so that each piece of fruit will nest in the lower cup of the individual extractor units 12.

Figure 3:
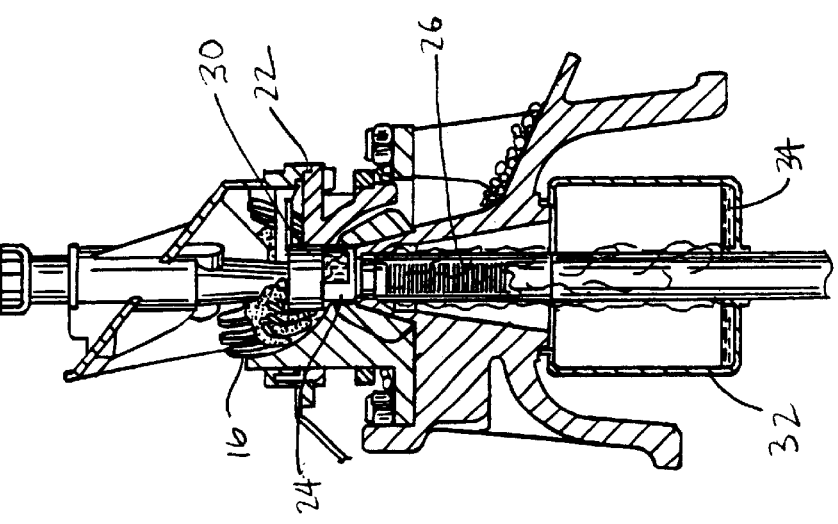
FIG. 3 is a view similar to FIG. 2 showing the internal portions of the citrus being forced through the strainer tube and into a reservoir.
Figure 2:
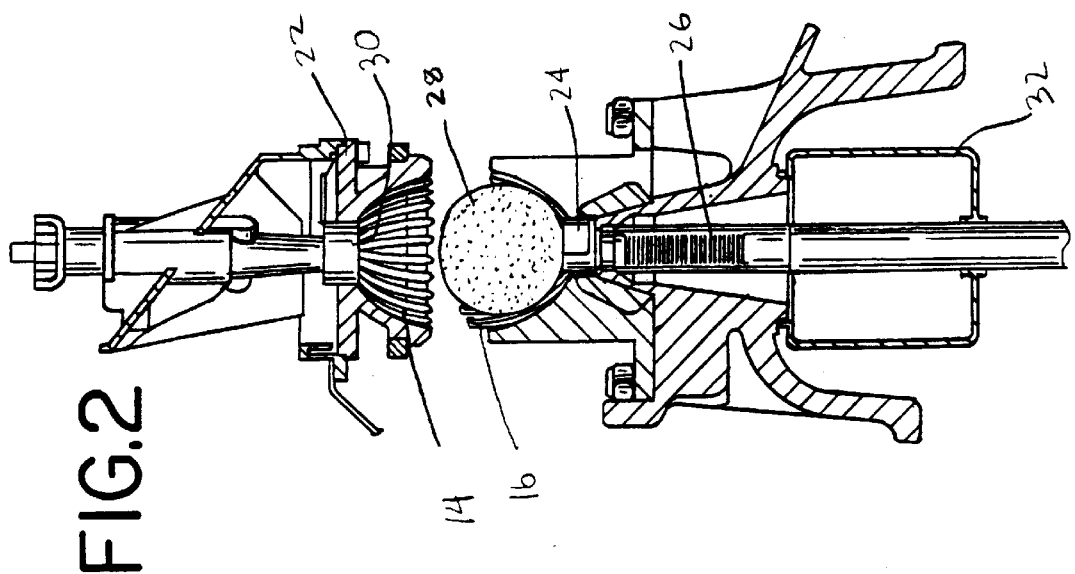
FIG. 2 is a fragmentary longitudinal view in partial cross-section of a single juice extracting mechanism embodying the present invention.

With reference now to FIGS. 2 and 3, there is seen an individual extractor unit 12 with the upper and lower cups 14, 16, respectively. The upper cup 14 is supported on a cross bar 22 which moves in a fixed up and down direction by means of a cam-operated drive (not shown) contained in the top portion of the extractor machine 10. The lower cup 16 is rigidly positioned and secured to the frame 18.

As illustrated, the upper and lower cups 14, 16 are formed as interdigitated cups having fingers that intermesh together as the upper cup is moved into the lower cup. The cam-operated drive system forces the upper cup 14 into the lower cup 16 and presses the fruit against a circular cutter tube 24 located at the base of the lower cup 16 and on top of an elongated prefinishing or strainer tube 26. The cutter 24 cuts a plug in the bottom of the fruit 28 to allow the internal portions of the fruit access to the interior of the strainer tube 26.

An upper cutter 30 is associated with the upper cup 14 and cuts a plug in the top of the fruit to permit separation of the peel from the internal portions of the fruit 28 as the fruit 28 is squeezed between the upper and lower cups 14, 16. The inner portion of the fruit 28 is forced down into the strainer tube 26 (FIG. 3), and a plunger tube (not seen) received on the interior of the strainer tube 26 moves upwardly to force the inner portions of the fruit 28 that are appropriately sized through the strainer tube and into a juice manifold or reservoir 32, where the juice 34 is collected. The peel is discharged between the upper cup and upper cutter.

In keeping with the invention, it has been determined that both the configuration and the orientation of the strainer tube 26 affects the quality of the juice and pulp within the juice extracted from the fruit. Specifically, it has been found that a vertically oriented strainer tube 26 having a plurality of circumferential slots along its working length provides for a juice, and especially juice pulp, having a preferable texture profile. This is believed to occur because the combination of circumferential slots and vertical orientation results in enhanced pulp collection volumes and less damage to the pulp as it passes through the strainer tube 26.

Referring more specifically to the strainer tube, it has a working length 36 along which the circumferential slots are positioned. Working length 36 has both solid space and open or free space. The ratio of solid space to free space is between about 1 to 4 and about 4 to 1, preferably the ratio is between about 2 to 1 and about 1 to 2. Most preferably the ratio is on the order of about 1 to 1.

In the illustrated embodiments, the free space is in the form of circumferential slots 38, and the solid space is in the form of metal or polymer land areas between the slots, both circumferential land areas 40 between the slots and axially oriented land areas 42 between slot sections. The axially oriented lands 42 provide structural support. Each axially oriented land 42 can be in axial alignment with adjacent axial lands to form a spine 44 as in the upper position of working length 36. Offset orientations also are acceptable and can be advantageous in reducing obstructions for passage of juice pulp through the circumferential slot sections. One such possible offset arrangement is illustrated in the lower portion of the working length shown in FIG. 4. It also can be advantageous to combine the spine structure with the offset structure, one of the possible combinations in this regard being thus shown in FIG. 4.

Figure 4:
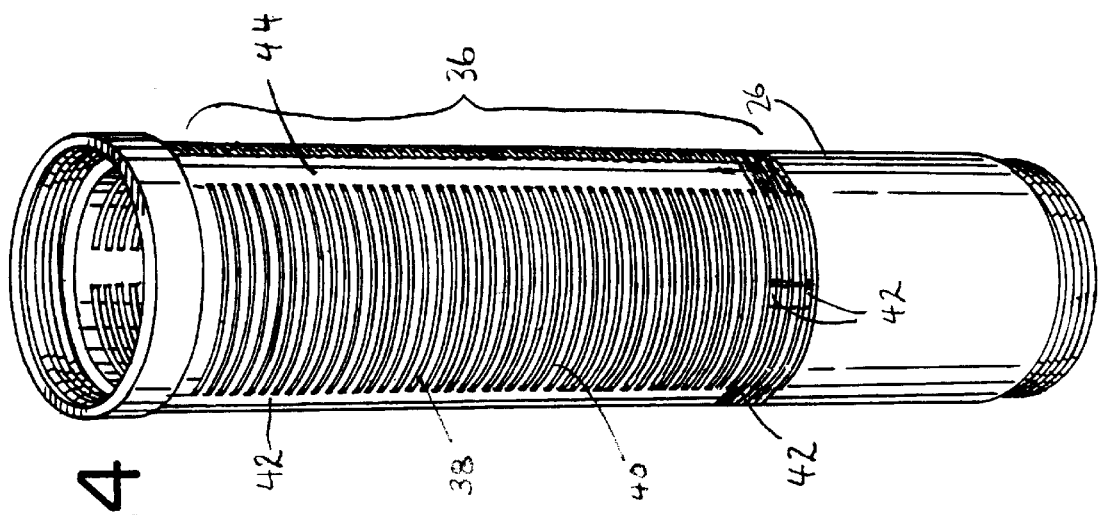
FIG. 4 is an enlarged perspective view of a strainer tube according to the present invention, also showing an alternative slot arrangement.

With further reference to FIG. 4, there is seen an embodiment of the strainer tube 26. The strainer tube 26 includes a plurality of circumferential slots 38 along its working length 36. As illustrated, the width of the slots 38 is equal, and the slots are evenly spaced by the circumferential land areas 40 along the working portion of the strainer tube 26. In practice, the width of the slots preferably is between approximately 0.5 and 3 millimeters, and the width of the circumferential land areas preferably is between about 0.5 and about 3 millimeters. Slot widths and land widths can vary along the working length.

Figure 5:
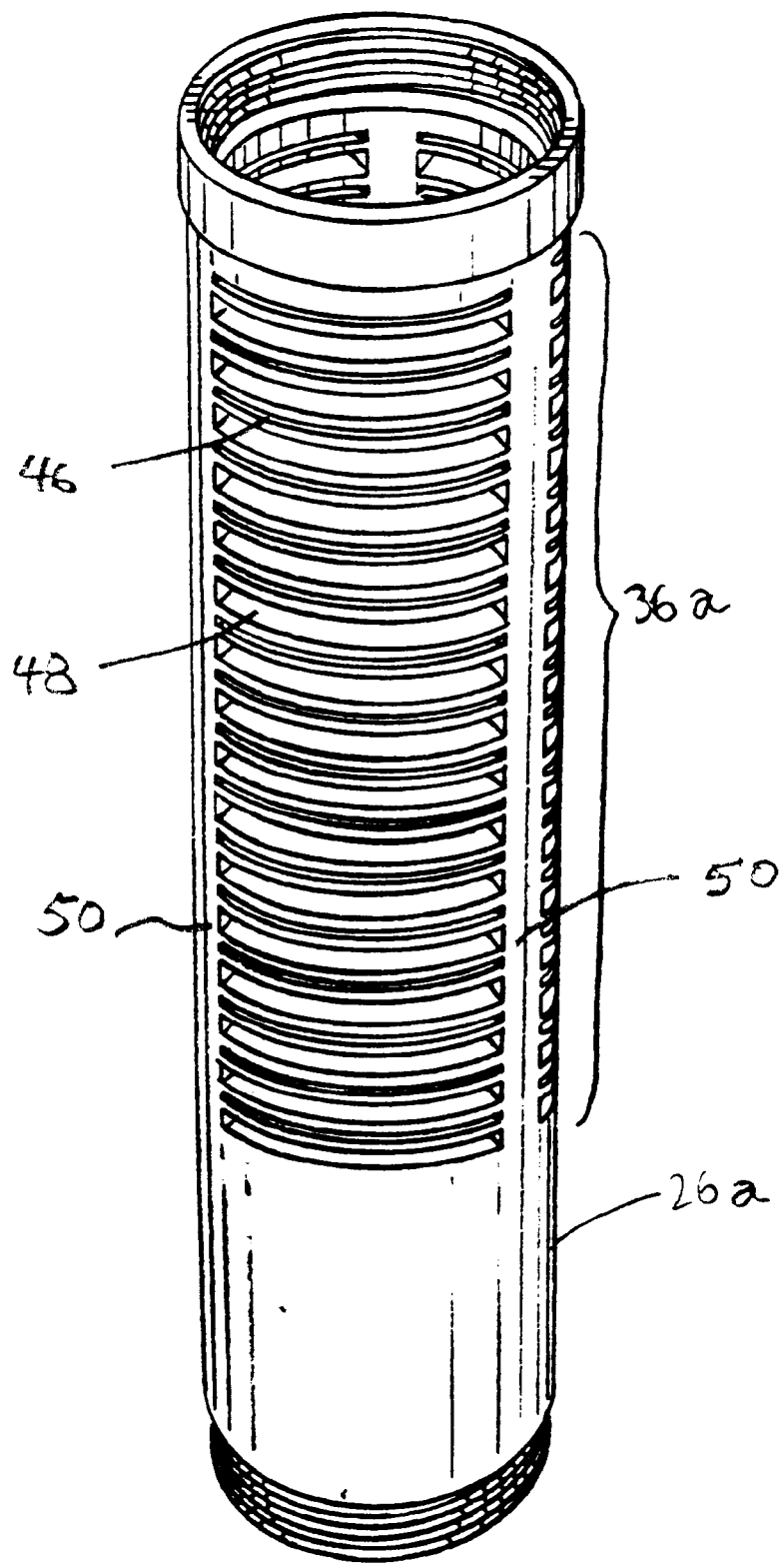
FIG. 5 is a perspective view of another alternative design for the strainer tube.

With reference to FIG. 5, there is seen an alternate embodiment of the strainer tube 26a of the present invention. In the strainer tube 26a of FIG. 5, the width of the slots varies. Specifically, the slots are of two different alternating widths. Again, the widths of the slots are between 0.5 and 3 millimeters. In this illustrated embodiment, the slots are evenly spaced apart with the width of slots 46 being 1 millimeter and the width of slots 48 being 2 millimeters. The typical spacing between the slots can be between 0.5 millimeter and 3 millimeters. Spines 50 can be provided as shown, or offset land arrangements can be substituted.

Thus, a juice extractor has been provided that meets the objects of the foregoing invention. While the invention has been described in terms of certain preferred embodiments, there is no intent to limit it to the same. Instead, the scope of the invention is defined by the appended claims.

What is claimed:

1. An extractor for separating juice and juice sacs from a citrus fruit, the apparatus comprising:

a lower cup for supporting a single piece of citrus fruit;

an upper cup disposed vertically above the lower cup, the upper and lower cups moveable relative to each other in a vertical direction so as to cooperate to squeeze the citrus fruit therebetween;

an upper cutter for cutting a plug in the citrus to permit the separation of the peel from the juice and juice sacs;

a lower cutter for cutting a plug in the citrus to allow the juice and juice sacs to exit therethrough;

an elongated strainer tube vertically oriented beneath the lower cup and lower cutter, the strainer tube having a plurality of circumferential slots along at least a portion of its length so as to define solid space and free space; and a plunger tube slidingly received within the strainer tube for forcing the juice and juice sacs outwardly through the slots in the strainer tube into a separate reservoir.

2. The extraction apparatus of claim 1 wherein the ratio of solid space to free space is between approximately 4 to 1 and approximately 1 to 4.

3. The extraction apparatus of claim 1 wherein the ratio of solid space to free space is between approximately 2 to 1 and approximately 1 to 2.

4. The extraction apparatus of claim 1 wherein the ratio of solid space to free space is approximately 1 to 1.

5. The extraction apparatus of claim 1 wherein each slot comprises an open area and at least one land.

6. The extraction apparatus of claim 5 wherein the lands of each slot are aligned with the lands of the other slots to form at least one axially oriented spine.

7. The extraction apparatus of claim 5 wherein the lands of adjacent slots are displaced from each other.

8. The extraction apparatus of claim 1 wherein the slots in the strainer tube are of equal width and evenly spaced apart.

9. The extraction apparatus of claim 8 wherein the slots in the strainer tube are between approximately 0.5 and 3 millimeters in width.

10. The extraction apparatus of claim 1 wherein the slots in the strainer vary in width.

11. The extraction apparatus of claim 10 herein the slots in the strainer tube vary between about 0.5 and 3 millimeters in width.

\* \* \* \* \*

UNITED STATES PATENT AND TRADEMARK OFFICE
CERTIFICATE OF CORRECTION

PATENT NO. : 6,293,189 B1
DATED : September 25, 2001
INVENTOR(S) : Kevin E. Evans, Jeffrey L. Korengel, Harold Pollack and David S. Lineback It is certified that error appears in the above-identified patent and that said Letters Patent is hereby corrected as shown below:

<u>Column 2,</u>
Line 6, delete "stainer" and insert -- strainer --.

<u>Column 4,</u>
Line 58, delete "herein" and insert -- wherein --.

Signed and Sealed this

Nineteenth Day of March, 2002

Attest:

JAMES E. ROGAN
*Attesting Officer*    *Director of the United States Patent and Trademark Office*